March 5, 1968  H. W. REHR ETAL  3,371,767
COLOR SELECTOR MECHANISM AND METHOD

Filed July 1, 1966  9 Sheets-Sheet 1

INVENTORS
HENRY W. REHR
LAWRENCE E. WEINERT
JAMES B. COLE

BY

Stanley Bialos
ATTORNEY

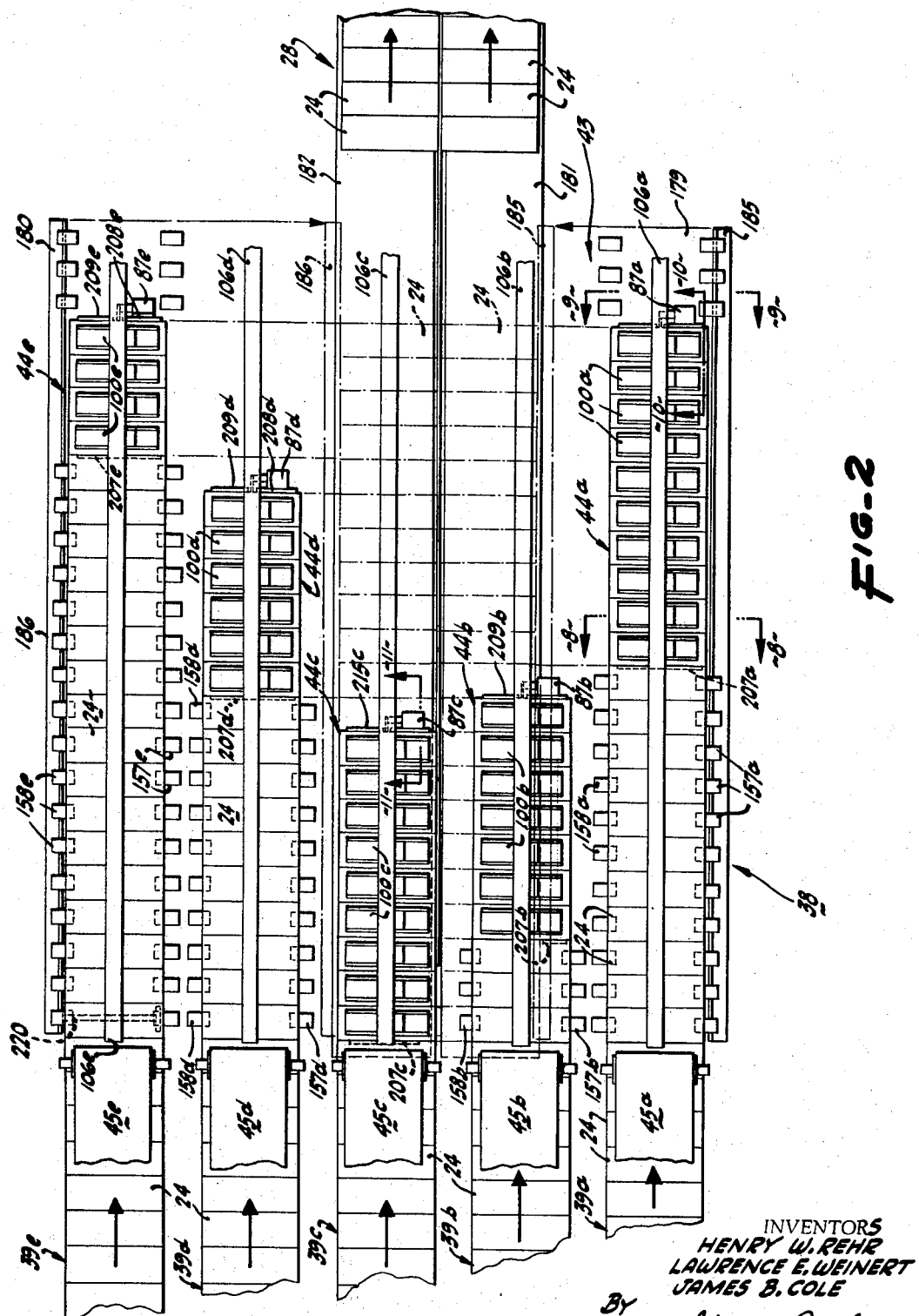

March 5, 1968 H. W. REHR ET AL 3,371,767
COLOR SELECTOR MECHANISM AND METHOD
Filed July 1, 1966 9 Sheets-Sheet 3

INVENTORS
HENRY W. REHR
LAWRENCE E. WEINERT
JAMES B. COLE
BY
Stanley Bialos
ATTORNEY March 5, 1968 H. W. REHR ETAL 3,371,767
COLOR SELECTOR MECHANISM AND METHOD
Filed July 1, 1966 9 Sheets-Sheet 5
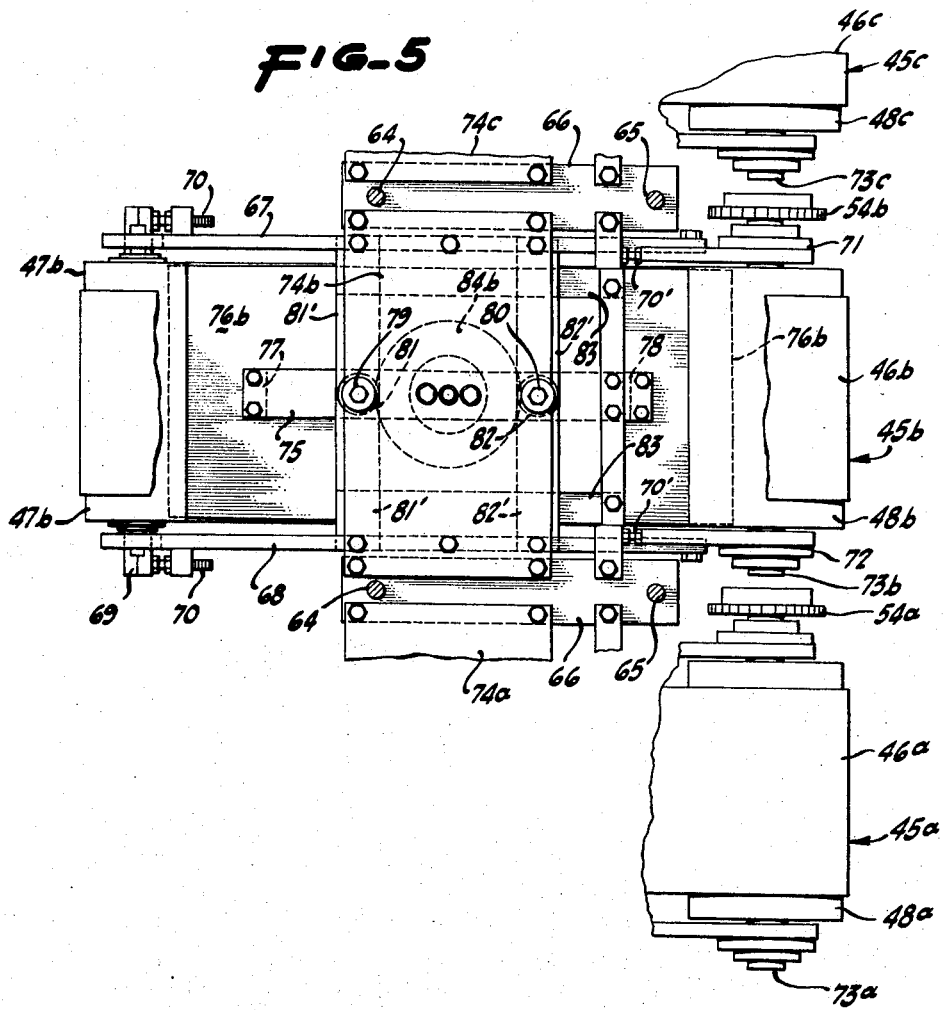
INVENTORS
HENRY W. REHR
LAWRENCE E. WEINERT
JAMES B. COLE
BY
Stanley Bialas
ATTORNEY

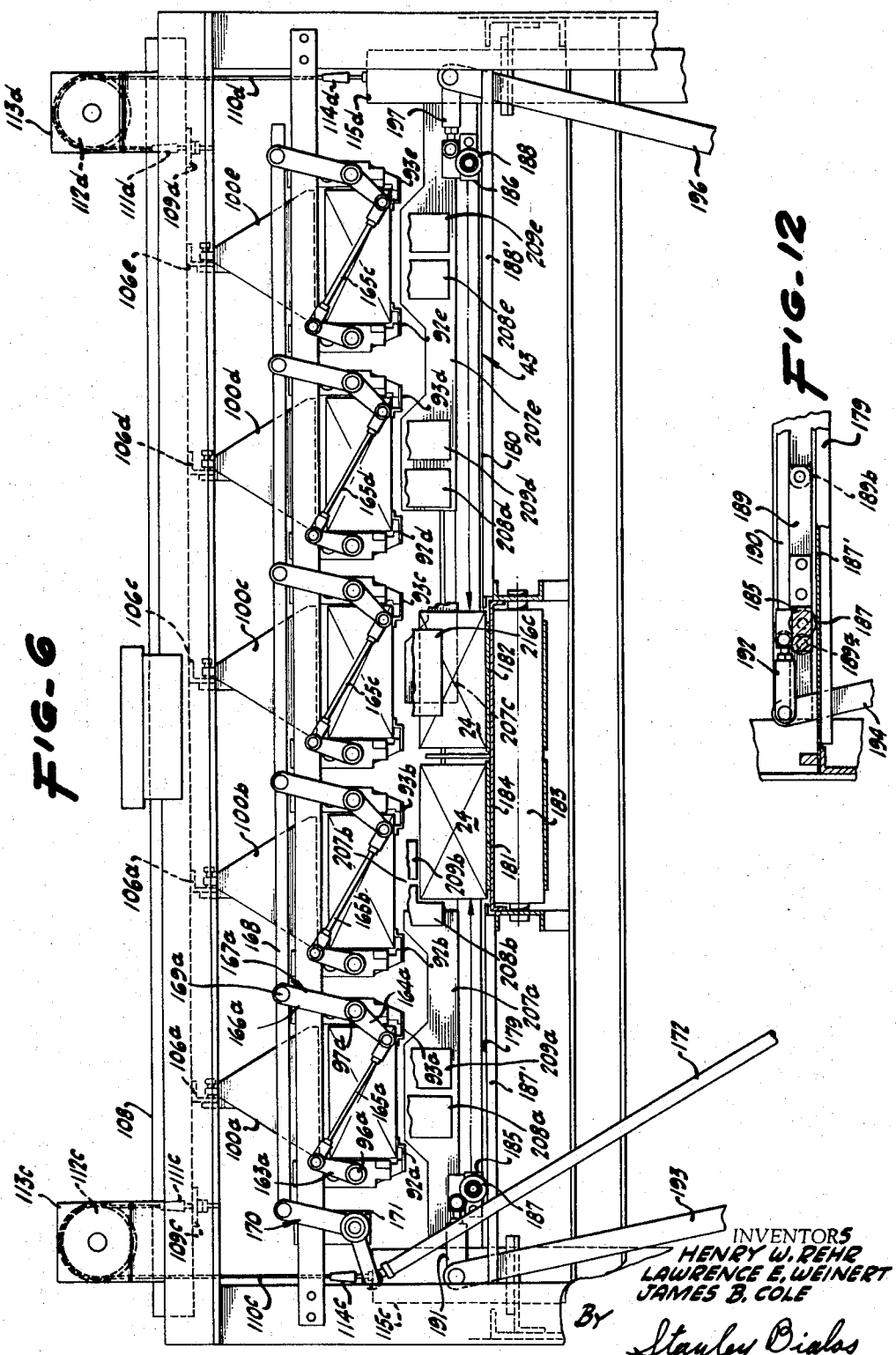

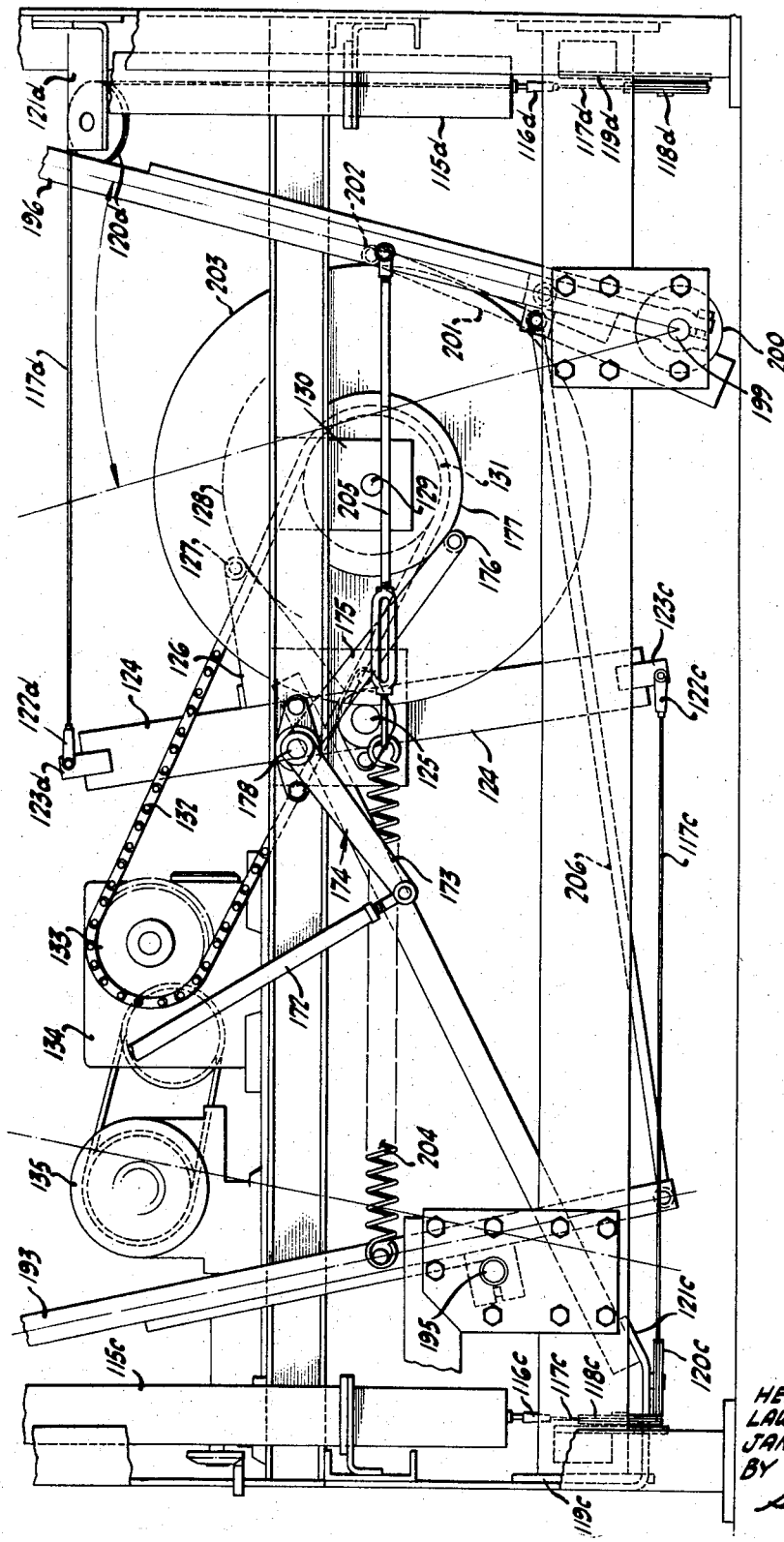

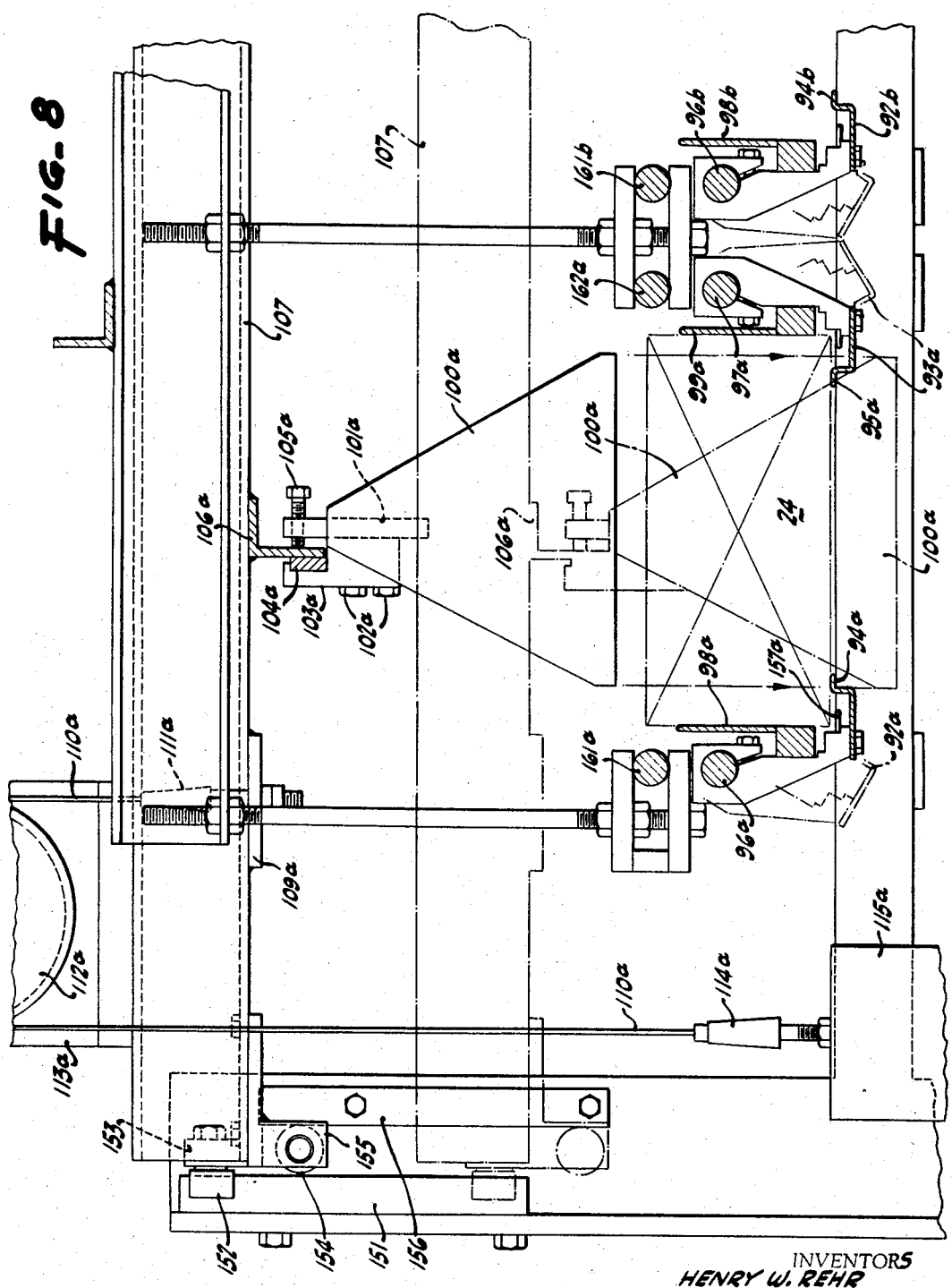

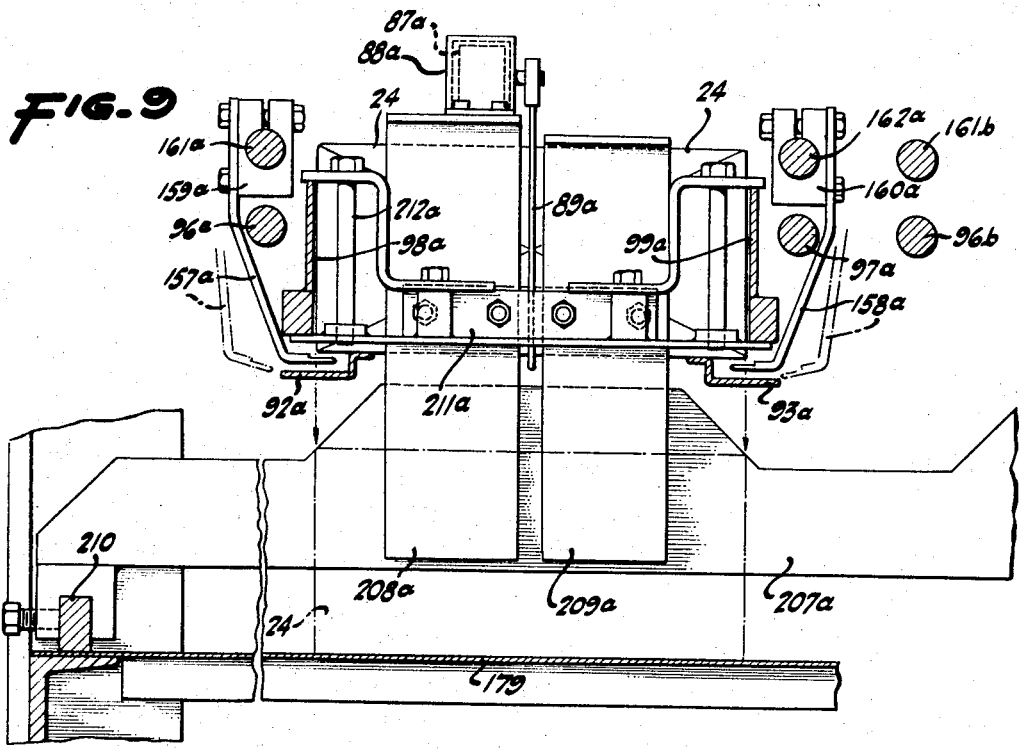
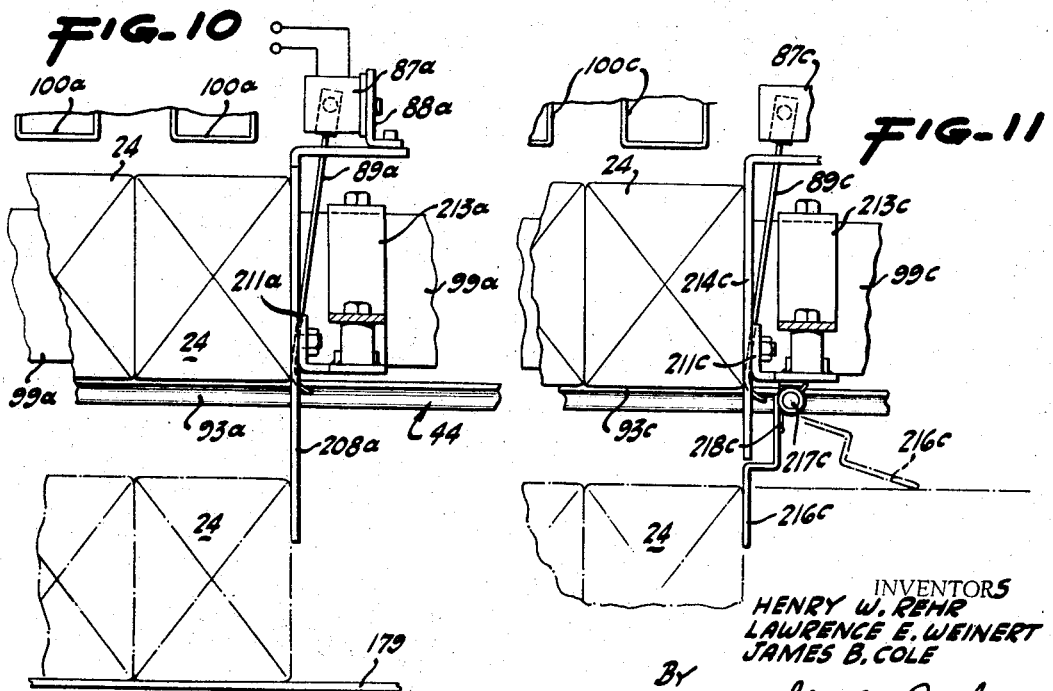

United States Patent Office 3,371,767
Patented Mar. 5, 1968

3,371,767
COLOR SELECTOR MECHANISM AND METHOD
Henry W. Rehr, Concord, Lawrence E. Weinert, Antioch, and James B. Cole, Mercer Island, Calif., assignors to Crown Zellerbach Corporation, San Francisco, Calif., a corporation of Nevada
Filed July 1, 1966, Ser. No. 562,204
32 Claims. (Cl. 198—30)

ABSTRACT OF THE DISCLOSURE

Mechanism for and method of selecting predetermined numbers of facial tissue cartons respectively containing tissue of one of a plurality of colors from a greater plurality of cartons of each such color so that mixed-lot cases comprising cartons of each such color can be packaged. The mechanism includes a plurality of parallel tracks, one for each color, along which the cartons of tissue are advanced. Rails defining each such track are periodically opened to permit cartons supported thereon to pass downwardly therebetween. However, retainers located along each track are operative to prevent certain of the cartons advanced therealong from passing downwardly between the open rails. Accordingly, a lesser number of cartons of each such color are selected from the greater plurality thereof for assembly and packaging into a mixed-lot case. The method involves the steps of advancing cartons of each such color into a selection station, displacing such lesser number of cartons of each color from the selection station and assembling the displaced cartons for packaging thereof in such mixed-lot cases.

---

This invention relates to a selector mechanism and to a method of selection, which mechanism and method are especially useful in packaging cartons of paper facial tissue in shipping containers or cases therefor. In greater particularity, the invention relates to a color selector mechanism and method for use in packaging mixed-lot cases of colored facial tissue.

For many years paper facial tissue has been packaged in cartons for sale to the consumer through retail outlets; and until quite recently white has been the only color in which facial tissue was available. At present, however, tissue is being offered in several different colors; and although there has been consumer acceptance of all such colors, it has been found that the rate of purchase varies as between different colors. This variation in rate of purchase, or sale to the consumer, has been burdensome to many retail outlets in that such outlets tend to become overstocked in certain colors in those instances where cartons containing tissue of any one color are ordered in case lots.

To avoid this situation, retailers have adopted the practice of ordering cartons of facial tissue in mixed-lot cases comprising several different colors. For example, a case of tissue may consist of 36 (24 is another common number) individual cartons, and a typical order might be for 11 cartons of white tissue, 8 cartons of blue tissue, 7 of yellow, 6 of green, and 4 of pink. So far as is known, manual packaging of such mixed-lot cases has been the only means heretofore employed to fill such an order; and manual packaging is of course expensive, and in certain instances has resulted in an increase in the cost of manufacture in the order of 25 cents per 36-carton case.

It is, accordingly, an object, among others, of the present invention to provide a method and mechanism by means of which a predetermined ratio of cartons of variously colored tissue is automatically selected from a supply of such cartons and the selected cartons then advanced to a case-packing apparatus for packaging thereby—it being understood that the term "variously colored tissue" is used to describe the condition in which each carton contains tissue of only one color but in which more than one color is represented in a group of cartons.

An embodiment of the invention is illustrated in the accompanying drawings, in which:

FIGURE 2 is an enlarged, broken diagrammatic view of the color selector mechanism shown generally in FIGURE 1 and comprising a part of the production system illustrated therein;

FIGURE 3 is a broken side view in elevation of the color selector mechanism;

FIGURE 5 is a broken longitudinal sectional view taken along the line 5—5 of FIGURE 4;

FIGURE 6 is a broken end view, essentially in elevation, of the upper portion of the color selector mechanism;

FIGURE 7 is a broken end view in elevation, similar to FIGURE 6, but illustrating the lower portion of the color selector mechanism and, in particular, one of the drive assemblies thereof;

FIGURE 8 is a still further enlarged, broken transverse sectional view taken along the line 8—8 of FIGURE 2;

FIGURE 9 is a broken transverse sectional view taken along the line of 9—9 of FIGURE 2;

FIGURE 10 is a broken longitudinal sectional view taken along the line 10—10 of FIGURE 2;

FIGURE 11 is a broken longitudinal sectional view taken along the line 11—11 of FIGURE 2; and FIGURE 12 is a fragmentary sectional view of a portion of the combining mechanism which is shown in most detail in FIGURE 6.

GENERAL DESCRIPTION

Figure 1:
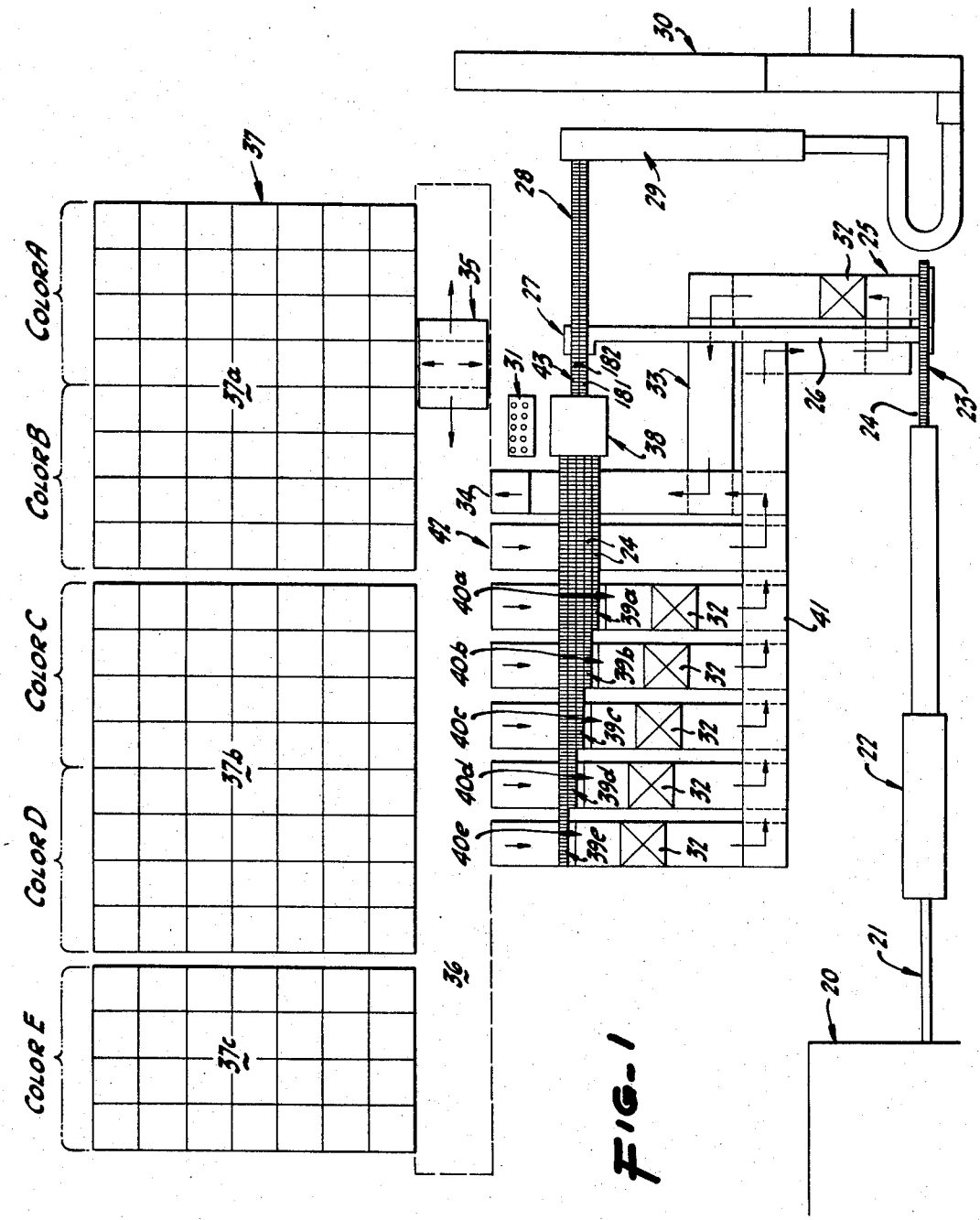
FIGURE 1 is a block diagram illustrating an entire box facial tissue production system embodying the invention.

An entire box facial tissue fabrication line is illustrated in FIGURE 1, and referring thereto it will be noted that such line includes a back stand stand generally denoted with the numeral 20. The back stand 20 constitutes a plurality of individual parent rolls (not shown) of tissue totaling, in the usual instance, 102 separate rolls each providing a web which is slit longitudinally as it is withdrawn from the roll into two individual webs each of facial tissue width (usually about 8½ inches wide). The paper webs are withdrawn concurrently from the parent rolls, and as such individual webs are advanced, they are folded into the desired size and are stacked one upon another to form a longitudinally extending "log" 21 comprising 204 individual webs oriented in vertical juxtaposition.

The log 21 is advanced into a saw and cartoning machine 22 which severs the log transversely at spaced-apart locations therealong to section the same into facial tissue lengths, and then places each such section into a carton therefor which is thereafter closed and advanced along a conveyor 23. Accordingly, the conveyor 23 has disposed therealong a succession of individual cartons oriented in side-by-side juxtaposition, which cartons are denoted with the numeral 24.

As concerns the present invention, the back stand 20, cartoning machine 22 and each of the cartons of tissue may be completely conventional and, as is well known, each such carton, as a typical example, will contain 200 double-ply tissues folded into a C-shaped or Z-shaped configuration.

Adjacent the end of the conveyor is a tote box loader 25 and also a by-pass conveyor section 26 which terminates at a diverter 27. Associated with the diverter 27 is a discharge conveyor 28 which empties into a case packer 29 operative to place a group of cartons 24 (usually totaling 36) into a shipping case. After the shipping case has been packed it can be placed upon a pallet in a palletizer 30. The case packer 29 and palletizer 30 may be conventional pieces of equipment as respects the present invention.

Whether the cartons 24 are advanced through the by-pass section 26 or are advanced into the tote box loader 25 is a matter of manual selection made by an operator controlling the entire fabrication line by means of a control console 31. When the selection is such that the cartons 24 are advanced into the loader 25, the cartons are collected into individual layers comprising a plurality of transversely and longitudinally extending rows, and the cartons are then displaced layer-by-layer into a tote box 32 which, in the specific structure being considered, is sufficiently large to receive therein 972 individual cartons. After the tote box 32 has been loaded with cartons, it is advanced along a conveyor structure 33 to a pickup station 34 where it is grasped by a storage bank loader 35 selectively movable along an elongated track 36.

Disposed along the track 36 is a storage bank 37 adapted to accommodate, in the apparatus shown, cartons containing tissue of five separate colors. For this purpose, the storage bank 37 is divided into five sections of equal capacity, which equality of capacity is not essential, respectively denoted by brackets and designated by the legends Color A through Color E. Each such section comprises a plurality of vertically stacked tiers each of which includes a plurality of side-by-side rows respectively containing a plurality of tandemly disposed tote-box-receiving compartments. The storage bank loader 35 is movable along the track 36 to the pickup station 34 where it grasps a loaded tote box 32, then carries such tote box to the appropriate color section of the storage bank 37, elevates the tote box to an appropriate tier and row thereof, and finally displaces the tote box into the forwardmost compartment of such row from which the box enters the particular compartment intended therefor.

Ultimately the storage bank 37 will contain a relatively large number of cartons of variously colored tissue, and a large capacity for the storage bank is required because a period of several hours of operation follows each loading of the back stand 20 with parent rolls of any one color. By way of example: a loaded back stand may accommodate a continuous period of operation of about six to eight hours, and a production line cannot practicably be changed over from the cartoning of one color to the cartoning of another until the back stand 20 is depleted. Therefore, the storage bank 37 must be able to accommodate an entire run of each of four colors (assuming a 5-color operation) before cartons containing the fifth color can be packaged and shipping cases packed with cartons of each color. By way of indicating the size of the storage bank 37, it may have a capacity of 640 tote boxes containing 622,080 cartons of facial tissue so that each such color section will have a capacity of 128 tote boxes. The particular storage bank illustrated is comprised of three separate structural components denoted 37a, 37b and 37c, but the arrangement is a matter of choice.

The number of cartons of each color of tissue which will be packed in any one case is predetermined, and cartons in appropriate number and color in accordance with such determination are automatically delivered to the aforementioned discharge conveyor 28 by a color selector mechanism 38. The delivery of cartons to the selector 38 is effected by a plurality of infeed structures or conveyors 39a–39e, respectively adapted to receive cartons containing the various tissue colors. The infeed conveyors 39a–39e receive cartons from a group of tote box unloaders 40a–40e respectively associated with the infeed conveyors 39a–39e. Loaded tote boxes are delivered to the unloaders 40 by the storage bank loader 35 which withdraws such tote boxes from the storage bank 37 on command from the control console 31.

After a tote box has been emptied by an unloader 40, the empty tote box is advanced along a return conveyor 41 to the tote box loader 25 where it is available for a subsequent loading cycle. In the case where a sufficient supply of empty tote boxes 32 is available for use at the tote box loader 25, additional empty tote boxes may be diverted onto the conveyor structure 33 for return to the pickup station 34 from which it is deposited by the storage bank loader 35 into the storage bank 37. Should a need arise at the tote box loader 25 for additional empty tote boxes, they may be withdrawn from the storage bank 37 and delivered to the return conveyor 41 via a conveyor section 42.

A continuous supply of cartons of variously colored tissue is delivered by the infeed conveyors 39 to the selector 38, and the selector is operative to select and segregate or separate from such supply the requisite number of cartons of each tissue color and to arrange the separated cartons into two rows along a combining or assembly table 43 from which the cartons are advanced onto the discharge conveyor 28. As explained heretofore, the conveyor 28 advances such two rows of cartons into the case packer 29 which functions in a conventional manner to pack such cartons into a shipping case. Evidently, the diverter 27 must be conditioned selectively to receive cartons from the combining table 43 or from the by-pass section 26, since it is necessary that each of these two components deliver cartons to the discharge conveyor 28 through the diverter 27.

Summarizing the operation of the box facial tissue fabrication line illustrated in FIGURE 1, tissue webs are withdrawn from the parent rolls thereof provided at the back stand 20, and after being folded and stacked one upon another define an elongated log which is severed transversely into sections of carton length, each of which sections is then packaged into a carton therefor. The filled cartons are advanced in side-by-side succession toward the tote box loader 25 which is operative to place a predetermined number of cartons in each tote box 32. The loaded tote boxes are advanced one by one to the pickup station 34 from which they are deposited by the storage bank loader 35 into the storage bank 37 in the color section thereof corresponding to the color of the tissue.

When cartons having all of the necessary tissue colors are available in the storage bank 37, the storage bank loader 35 withdraws tote boxes from the storage bank and deposits each box at the appropriate tote box unloader 40 which is operative to unload the tote box and deposit the cartons therefrom on the associated infeed conveyor 39. Thereafter the empty tote boxes are returned to the tote box loader 25 and the cartons of tissue are fed into the color selector 38 which selects and segregates the requisite number of cartons of each tissue color and combines the segregated cartons into two parallel rows, which rows are then advanced by the discharge conveyor 28 into the case packer 29. Should it be desired to bypass the tote box loader 25, storage bank 37, tote box unloaders 40 and selector 38, the cartons 24 leaving the cartoning machine 22 are directed into the by-pass section 26 which delivers such cartons directly to the discharge conveyor 28 through the diverter 27; and in this event, each case will contain cartons of one tissue color only.

COLOR SELECTOR MECHANISM

Infeed conveyor structure

Referring to FIGURE 2, which is a broken top plan view illustrating the color selector mechanism 38, it is seen that the infeed conveyors 39 are spaced apart transversely and discharge into a plurality of respectively associated selector trays 44a–44e which are longitudinally aligned therewith and effectively define continuations thereof. The selector trays 44, which may be taken to be selection stations, are not all of the same length and, as is evident in FIGURE 2, the two outermost trays 44a and 44e terminate in substantial transverse alignment, the tray 44d is of somewhat shorter length, the tray 44b is still shorter, and the tray 44c is the shortest of all. This relationship is advantageous in combining segregated cartons into two rows, as will be described in detail hereinafter.

The cartons 24 are advanced by the infeed conveyors 39 to the terminal ends thereof adjacent the selector trays, and the cartons are then positively displaced onto the selector trays 44 by the infeed conveyors in cooperation with presser conveyors 45a–45e with which the infeed conveyors are respectively equipped. As shown most clearly in FIGURES 3 and 4, each presser conveyor 45 comprises an endless belt 46 entrained at the opposite ends thereof about rollers 47 and 48 of which the roller 48 is driven by means including an endless chain 49, a sprocket motor 50 and a drive motor 51. More specifically, the drive motor 51 is equipped with a gear reducer section having a drive shaft extending outwardly therefrom which is equipped with a drive sprocket 52 about which the chain 49 is entrained; and a take-up sprocket 53 is arranged with the chain to remove slack therefrom.

Further, the chain 49 is also entrained about another sprocket 54 drivingly connected with a roller 55 about which is entrained an endless belt 56 forming a part of the associated infeed conveyor 39. Accordingly, the motor 51 concurrently drives both of the belts 46 and 56, and the directions of movement thereof are toward the associated selector tray along those reaches of the belts which are facing each other. Therefore a carton 24 being advanced by an infeed conveyor toward the associated selector tray 44 is gripped by and between the two belts 46 and 56 and is positively displaced thereby onto the selector tray.

Figure 4:
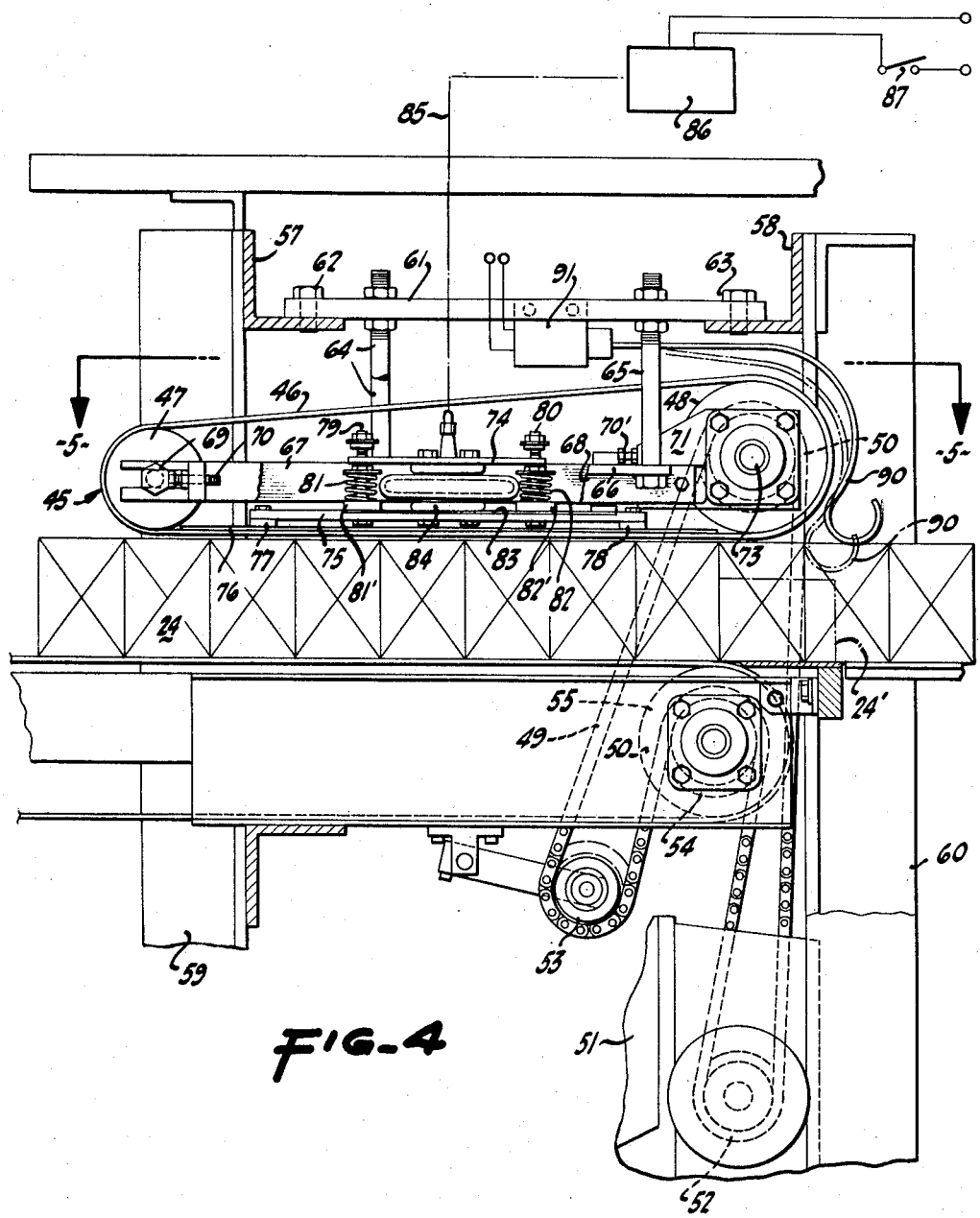
FIGURE 4 is a further enlarged, broken side view in elevation of a presser conveyor forming a component of one of the infeed conveyors of the color selector mechanism.

Each of the presser conveyors 45 is supported above the associated infeed conveyor 39 and, as shown in FIGURES 3 and 4, the mounting means for the presser conveyors includes a pair of L-shaped channels 57 and 58 which extend transversely of the color selector mechanism 38 and are respectively supported adjacent the ends thereof by upright frame members 59 and 60. The channels 57 and 58 may be welded or otherwise rigidly secured to the frame members 59 and 60, and the frame members may be suitably reinforced or rigidified by additional channel structures and frame components, as shown in the drawings and particularly in FIGURE 3 thereof.

Extending between the channels 57 and 58 at transversely spaced locations therealong are two upper support bars or frame members 61 rigidly secured to the channels as by cap screws 62 and 63. Depending from each bar 61 are a pair of longitudinally spaced hangers 64 and 65 which may be threaded at their upper ends and adjustably related to the associated bar 61 by means of the nuts illustrated. Adjacent their lower ends each pair of hangers 64 and 65 carries a lower horizontally disposed bar 66 which is secured thereto, which bars 66 are adapted to support (through intermediate structure) a pair of support members 67 and 68 disposed along the edges of the bars slightly inwardly thereof. The support members 67 and 68 at one end are bifurcated to provide a longitudinally extending recess therealong which receives therein the axle or shaft 69 of the aforementioned roller 47. An adjustment structure 70 is associated with each such bifurcated end of the support members 67 and 68 to permit the roller 47 to be displaced longitudinally with respect to such support members to suitably align the axle and tighten the endless belt 46 entrained about the roller. At their opposite end the support members 67 and 68 are equipped with movable brackets 71 and 72 which provide a mounting for the axle or shaft 73 of the roller 48, and adjustment structure 70' may be associated with each of the brackets for axle-alignment and belt-tightening purposes.

The lower bars 66 are respectively oriented in underlying relation with the upper bars 61, and extending between any two successive lower support bars 66 is a mounting plate 74 fixedly secured thereto as by means of cap screws. Such arrangement provides a mounting plate 74 for each presser conveyor 45, and each mounting plate is disposed between the top and bottom reaches of the associated presser conveyor belt 46 and is secured to and carries the associated support members 67 and 68, such as by cap screws. Thus, the lower bars 66 are structurally fixedly secured to the plate 74, bars 67 and 68, and rollers 47 and 48, wherefore all of such components are carried by the upper bars 61 through the hangers 64 and 65.

Supported below each plate 74 and movable vertically with respect thereto is a longitudinally disposed carrier bar 75 which carries a presser plate 76. The presser plate 76 is spaced from the carrier bar 75, as by means of spacers 77 and 78 interposed therebetween, thereby defining a space between the bar 75 and the plate 76 to accommodate the heads of a plurality of mounting screws, shown in FIGURE 4. More particularly, vertical movement of the mounting plate 74 is afforded by the particular mounting arrangement employed which includes a pair of elongated bolts 79 and 80 extending through openings provided therefor in the mounting plate 74 and which are freely movable vertically with respect thereto. The bolts 79 and 80 extend upwardly through the carrier bar 75 and, accordingly, the heads of the bolts are disposed intermediate the carrier bar 75 and underlying presser plate 76.

Coaxially circumjacent the bolts 79 and 80 are helical springs 81 and 82 which at their lower ends respectively seat against transversely disposed stabilizing bars 81' and 82' which cross above the carrier bar 75. At their upper end, such springs 81 and 82 respectively seat against stop structures each of which is in the form of a washer and nut adjustably positioned along the associated bolt 79 or 80. Thus, the springs 81 and 82 resiliently urge the presser plate 76 upwardly relative to the bolts 79 and 80 which are movable vertically with respect to the mounting plate 74 within the limits defined by such stop structures which underlie the plate 74 and similar stop structures also carried by the bolts 79 and 80 and which overlie the plate 74. In the condition of the apparatus as illustrated in FIGURE 4, the presser plate 76 is in its upper position whereat the belt 46 is spaced above and therefore clears the cartons 24.

Disposed in underlying relation with the mounting plate 74 are two transversely spaced tie strips 83 which at one end seat upon the stabilizing bar 81' and at their other end are connected to the carrier bar 75, thereby stabilizing the presser plate 76. Interposed between the plate 74 and bar 75 is an inflatable bellows 84 which at its lower end is secured to the bar 75 and at its upper end to the plate 74. The bellows 84 is connected through a control valve with a source of pressurized fluid to enable the bellows to be selectively inflated; and in the illustration of FIGURE 4, such connection of the bellows is indicated by the line 85 leading from the bellows to the source of fluid and control valve indicated diagrammatically by the block 86. In the usual instance, the source of fluid will be compressed air and the valve will be a conventional solenoid-controlled device energized through a circuit which includes a limit switch 87 located along the associated infeed conveyor 39, as shown in greater detail in FIGURE 10. Referring thereto, it is seen that the switch 87 is supported by a bracket 88 positioned above the associated selector tray 44 and it is equipped with a depending arm 89 oriented in the path of movement of cartons 24 so as to be engaged thereby.

As seen best in FIGURE 4, the cartons 24 are supported upon a side wall thereof and in the ordinary instance the width of the cartons from side wall to side wall thereof is substantially greater than the height of the cartons from bottom wall to top wall. Upon occasion, a carton may be overturned along an infeed conveyor and will be resting upon either the top wall or bottom wall rather than upon one of the side walls. This condition is indicated in FIGURE 4 by the carton 24'. Since such a misaligned carton might cause malfunction of the entire apparatus, there is provided a detector mechanism in the form of a movable sensor arm 90 adapted to trip a safety switch 91 connected in the energizing circuit of the motor 51 so as to interrupt such circuit and thereby terminate operation of the infeed conveyor and associated presser conveyor whenever the sensor arm 90 moves downwardly into the position thereof illustrated by broken lines in FIGURE 4.

In a cycle of operation, the infeed conveyors 39 in cooperation with the respectively associated presser conveyors 45 advance cartons 24 into the various selector trays 44. When a selector tray is filled, the forwardmost carton 24 therein will engage the depending arm 89 of the associated switch 87 thereby opening it, whereupon the solenoid-controlled valve is de-energized and the bellows 84 deflated. As a result of such deflation, the presser plate 76 and belt 46 will move upwardly to disengage the under-surface of the belt 46 from the underlying cartons 24 (see FIGURE 4). After a plurality of cartons 24 are displaced from the filled selector tray 44, in a manner to be hereinafter described, the switch arm 89 is permitted to be displaced in a clockwise direction, as viewed in FIGURE 10, and the switch 87 is thereby closed to energize again the solenoid-controlled valve and thereby inflate the bellows 84. Such inflation of the bellows causes the carrier bar 75 and presser plate 76 to be displaced downwardly to cause the under-surface of the belt 46 to engage underlying cartons 24, whereupon the infeed conveyor 39 and associated presser conveyor 45 positively displace such cartons 24 into the associated selector tray 44 to refill the same.

It should be understood that each of the infeed conveyor structures, respectively comprising an infeed conveyor 39 and a presss conveyor 45, is identical with the others, and therefore the foregoing description applies equally to each such infeed conveyor structure. Quite evidently, an infeed conveyor structure is provided for each color accommodated by the color selector mechanism so that the presence of five conveyor structures in the particular apparatus under consideration indicates the capacity of such mechanism to accommodate five different colors. If either a greater or a lesser number of colors is to be accommodated by any particular design, the number of infeed conveyor structures will be increased or reduced accordingly.

*Selector tray structure*

Since there are five infeed conveyor structures in the apparatus being considered, there are also five separate selector tray structures 44 respectively aligned with such infeed conveyor structures to receive cartons 24 of facial tissue therefrom. Each of the selector tray structures is essentially identical with the others except with respect to the length, and the lengths of the trays may differ, as shown in FIGURE 2. Therefore, the following detailed description of one selector tray should be understood to apply equally to all such trays.

The selector tray structures are spaced apart transversely and, as shown in FIGURES 6 and 8, each tray includes a pair of first support elements or rails 92 and 93—the suffixes *a* through *e* being used in the drawings where appropriate to associate the rails properly (as well as other elements) with the various trays 44a through 44e. The rails 92 and 93 comprising each pair thereof are transversely spaced and define a track adapted to support cartons 24 thereon which are longitudinally slidable along such track. In this respect (see FIGURE 8), the rails 92 and 93 are respectively provided with elevated and in-wardly turned longitudinal edge portions 94 and 95 which receive each such carton thereon.

The rails 92 and 93 are respectively clamped to longitudinally extending rocket shafts 96 and 97 supported at spaced-apart locations therealong for pivotal displacements about their longitudinal axes so as to angularly displace the rails between the innermost and outermost positions thereof respectively illustrated in FIGURE 8 by full and broken lines. The rails may be clamped to the associated shafts in any suitable manner, as by means of providing the same at spaced-apart locations therealong with support arms having split collars which pass the shafts therethrough and which are then tightened upon the shafts with cap screws, as shown. In the structure illustrated, the rails are secured to the associated support arms by cap screws.

As indicated hereinbefore, the rails 92 and 93 in the innermost position thereof are adapted to receive and support a plurality of cartons 24 thereon, but the rails can be displaced to an outermost position sufficiently remote from the ends of the cartons 24 to permit the same to pass downwardly through the wide space then defined between the rails. For the purpose of positively locating the cartons 24 in a transverse sense so that they can pass downwardly between the rails 92 and 93 when the rails are displaced into their open or outermost position, longitudinally extending guide structures 98 and 99 are provided above the respectively associated rails 92 and 93 inwardly of their open position so as to confine the cartons 24 to a predetermined transverse location from which they can pass downwardly between the open rails.

Although in most instances the weight of each carton 24 is sufficient to cause the same to fall downwardly through the space defined between the guide structures 98 and 99 when the rails 92 and 93 are open, the apparatus shown includes a plurality of pushes or displacement elements adapted to respectively engage a carton 24 along the upper surfaces thereof and positively urge the same downwardly through the rails 92 and 93 when they are open. In this respect, a pusher component 100 is provided for each carton which is to be displaced or segregated from all of the cartons located along the various selector trays 44; and referring to FIGURE 2, the color selector mechanism there illustrated is conditioned to segregate a total of 36 cartons of tissues from all of the trays. In accordance with the ratio of cartons illustrated, and heretofore described, the selector tray 44a is provided with ten pusher components respectively denoted with the numeral 100a, the selector tray 44b is provided with seven pusher components 100b, the selector tray 44c has nine pusher components 100c, the tray 44d has six pusher components 100d, and the tray 44e has four such pusher components numbered 100e.

The front and rear faces of each pusher component 100 are somewhat triangular, as is evident in FIGURE 8; and in side elevation the pusher components are generally U-shaped, as is seen in FIGURES 10 and 11. Extending between the front and rear faces of each pusher component adjacent the upper edges thereof is a web 101 which is welded or otherwise rigidly secured to such faces. Affixed by cap screws 102 to the web 101 is a clamping block 103 which cooperates with a filler 104 and cap screw 105 threadedly received in an opening therefore in the web 101 to clamp the associated pusher component 100 to a hanger in the form of an L-shaped channel 106. The channel 106 extends longitudinally along the associated tray 44, and evidently the pusher components 100 can be selectively located therealong to respectively align the same with cartons 24. Additionally, this mounting arrangement for each pusher component 100 permits ready mounting and removal of pusher components whenever it is necessary to adjust the color selector mechanism 38 to accommodate a different color selection.

Each hanger 106 is located above the associated selector tray 44 at about the center thereof, and extends substantially from the terminal end of the infeed conveyor structure to the discharge end of the color selector mechanism (as shown best in FIGURE 3). Each such hanger 106 is fixedly secured adjacent the ends thereof to rear and front elevator members 107 and 108, respectively, as by means of welding. The elevator members 107 and 108 are vertically movable between the upper and lower positions respectively shown in FIGURE 8 by full lines and broken lines and, accordingly, cause each of the pusher components 100 to be movable therewith between the upper and lower positions thereof similarly shown in FIGURE 8 by full and broken lines, respectively.

The elevator members 107 and 108 are generally U-shaped channels and each such channel is supported at an end thereof by a pulley system such that a total of four individual but interconnected pulley systems are employed. Considering the details of such a pulley system, and referring to FIGURES 3 and 8, the rear elevator member 107 is seen to be provided adjacent an end thereof with a horizontally disposed fastener plate 109 to which is affixed one end of a cable 110 by means of a ferrule or coupling 111. The cable 110 passes over a sheave or pulley wheel 112 supported for rotation by a mounting bracket 113 which in turn is supported by appropriate frame elements of the mechanism including the L-shaped channel 58. The cable 110 extends downwardly from the pulley wheel 112 and is secured by a ferrule or coupling 114 to the upper end of a counterweight 115 of sufficient mass to counterbalance in part the elevator member 107 and components carried thereby.

Each end of each elevator member 107 and 108 is similarly provided with a cable, pulley wheel, and counterweight mechanism, and referring to FIGURES 3 and 7, the last of which illustrates the lower portion of the pulley system oriented with the front elevator member 108, it is seen that each counterweight 115 adjacent its lower end is connected by a ferrule or coupling 116 to a cable 117 entrained about a pulley wheel 118 supported for rotation on a bracket 119 fixedly secured to the frame structure of the mechanism (the letter suffixes $a$, $b$ and $c$, $d$ being used in association with the pulley systems arranged with the elevator members 107 and 108, respectively, to differentiate between the various components of such systems as illustrated in the drawings; and in this connection, the suffixes $a$ and $c$ denote the lefthand side of the elevator members as viewed in FIGURES 7 and 8 and the suffixes $b$ and $d$ denote the righthand side). The cables 117$a$ and 117$c$ (the differentiating suffixes now being stated because of slight differences in the various pulley systems) extend toward the center of the mechanism from the associated pulley wheels 118$a$ and 118$c$ and respectively transverse horizontally disposed pulley wheels 120$a$ and 120$c$ rotatably supported by mounting brackets 121$a$ and 121$c$. From the pulley wheels 120$a$ and 120$c$ the cables 117$a$ and 117$c$ extend inwardly toward the center of the mechanism, and at their ends the cables are pivotally connected by bifurcated couplings 122$a$ and 122$c$ to fastener ears 123$a$ and 123$c$ provided by one end of a crank arm or cam lever 124.

The crank arm is pivotally supported intermediate the ends thereof by a shaft 125; and extending laterally from the crank arm 124 is a cam follower structure 126 having at the end thereof the usual roller 127 which lies upon the configurated surface of a cam 128. The cam 128 is pinned or otherwise secured to a shaft 129 so as to rotate therewith. The shaft 129 is journaled for rotation in brackets 130, and secured to the shaft 129 is a drive sprocket 131 about which is entrained a drive chain 132 which in turn is entrained about an output sprocket 133 of the gear reducer section 134 of a drive motor 135.

Evidently, when the motor 135 is energized the shaft 129 will be rotated and the cam 128 will be rotated therewith. As a consequence, the crank arm 124 will be angularly reciprocated with respect to the axis of the shaft 125 to cyclically lengthen and then shorten the extent of the cables 110$a$ and 110$c$ present between the respective elevator members 107 and 108 and the associated pulley wheels 112$a$ and 112$c$. In this respect, when the crank arm 124 is pivoted in a clockwise direction, as viewed in FIGURE 7, about the axis of the shaft 125, the elevator members 107 and 108 along the lefthand sides thereof will be permitted to descend because the lengths of the cables 110$a$ and 110$c$ between such elevator members and the pulley wheels 112$a$ and 112$c$ are being increased. Conversely, when the crank arm 124 is angularly displaced in the opposite direction, the elevator members 107 and 108 will be raised.

As shown in FIGURE 7, the crank arm 124 at its other or upper end is equipped with a fastener ear 123$d$ to which is pivotally connected a bifurcated coupling 122$d$ fastened to the end of a cable 117$d$ which passes about an angularly oriented pulley wheel 120$d$ rotatably supported by a bracket 121$d$. The cable 117$d$ then transverses a pulley wheel 118$d$ rotatably supported by a bracket 119$d$, and thereafter the cable is connected by means of a ferrule or coupling 116$d$ to the lower end of a counterweight 115$d$. At its upper end the counterweight 115$d$ is connected through a ferrule or coupling 114 (as shown in FIGURE 3 by the corresponding $a$ and $c$ pulley systems) to a cable 110 which transverses a pulley wheel 112 supported for rotation on a bracket 113. The cable 110 is fixedly secured by a ferrule or coupling 111 to a horizontally disposed fastener plate 109 which is secured to the elevator member 108 adjacent the righthand end thereof. As a result of this arrangement, when the crank arm 124 is pivoted in a clockwise direction, as viewed in FIGURE 7, about the axis of the shaft 125, the elevator members 107 and 108 along the righthand sides thereof will be permitted to descend because the lengths of the cables 110$b$ and 110$d$ between such elevator members and the pulley wheels 112$b$ and 112$d$ are being increased. Conversely, when the crank arm 124 is angularly displaced in the opposite direction, the elevator members 107 and 108 will be raised.

It will be apparent that the $b$ and $d$ pulley systems are similar, as are the $a$ and $c$ systems, and since the crank arm 124 is connected at its opposite ends to the elevator members 107 and 108 through the pulley systems described which respectively include cables 110 and 117, and because of the disposition and orientation of the various pulleys about which such cables are entrained, angular displacement of the crank arm 124 in either direction results in the concurrent raising or lowering of the opposite ends of the elevator members 107 and 108 in accordance with the configuration of cam 128.

The elevator members 107 and 108 are constrained for reciprocatory displacement between the elevated and lowered positions thereof by guide structures respectively associated with such members adjacent the ends thereof. One such guide structure is shown in detail in FIGURE 8 and is seen to comprise a vertically extending rail 151 secured to the frame structure of the mechanism by cap screws. The guide structure further comprise a roller 152 rotatably supported by a bracket 153 fastened to the associated elevator member, a roller 154 rotatably supported by a bracket 155 fastened to such elevator member, and a rail 156 which is also vertically extending and secured to the frame structure of the mechanism. The rollers 152 and 154 are oriented at right angles with respect to each other and are adapted to respectively ride along the rails 151 and 156. The roller 152 in cooperation with the rail 151 is operative to prevent longitudinal displacements of the associated elevator member, and the roller 154 in cooperation with the rail 156 is operative to prevent transverse displacements thereof.

Referring particularly to FIGURE 9, it will be seen that each of the selector trays 44 includes in association with its first support elements or rails 92 and 93 a plurality of longitudinally adjustable second support elements or retainers 157 and 158 which are respectively secured by mounting blocks 159 and 160 to longitudinally extending shafts 161 and 162. The mounting blocks 159 and 160 are longitudinally slidable along the respectively associated shafts 161 and 162 and can be clamped at any selected location therealong so as to provide at such location a fixed abutment engageable with a carton 24 to prevent the same from moving downwardly between the guide structures 98 and 99 when the rails 92 and 93 are displaced into the open position thereof. However, the retainers 157 and 158 can be clamped to the shafts 161 and 162 in either an inner position, shown by full lines in FIGURE 9, wherein such retainers are disposed beneath a carton 24, or in an outer position, shown by broken lines in FIGURE 9, wherein the retainers are clear of such carton and will permit the same to move downwardly therebetween. Accordingly, any pair of retainers 157 and 158 can be used or not used by appropriate manual adjustment as any particular color selection may require.

As explained hereinbefore, the rails 92 and 93 are movable between the open and closed positions shown in FIGURE 8 and movement between such positions is enforced thereon by an actuating structure which includes in part the pivotally supported shafts 96 and 97. Referring to FIGURE 6, it will be noted that each pair of shafts 96 and 97 is drivingly interconnected by linkage comprised of crank arms 163 and 164 respectively connected to the shafts and in turn pivotally connected to a rod 165. The crank arm 164, together with a link 166, defines a bell crank 167, and the link 166 is pivotally connected to a transversely reciprocal drive shaft 168 through a stub shaft 169.

Adjacent one of its ends the drive shaft 168 is pivotally connected to one arm of a bell crank 170 which is pivotally supported intermediate the ends thereof on a bracket 171. The other arm of the bell crank 170 is pivotally connected to one end of an elongated push rod 172. Referring to FIGURE 7, the push rod 172 at its other end is pivotally connected to an arm 173 of a bell crank 174, the other arm 175 of which is provided with a cam follower that lies within a closed cam 177. The cam 177 is mounted upon the aforementioned shaft 129 and is rotatably driven thereby when the motor 135 is energized.

Rotation of the cam 177 results in displacements of the bell crank 174 about the longitudinal axis of a shaft 178 upon which it is mounted, and such angular displacements of the bell crank cyclically reciprocate the push rod 172 along the longitudinal axis thereof. Such displacements if the push rod 172 cause the bell crank 170 to reciprocate the drive shaft 168 along the longitudinal axis thereof, thereby causing each of the links 166 to angularly displace the associated shaft 97, whereupon the rail 93 carried thereby is moved between its open and closed positions. Correspondingly, the shaft 96 is angularly displaced because of its interconnection with the shaft 97, defined by the crank arms 163 and 164, so that the rail 92 carried by such shaft 96 is similarly displaced between its open and closed positions. Thus, the rails 92 and 93 are moved between the carton-retaining and carton-release positions thereof by actuator structure which, in the present mechanism, includes the shaft 129, motor 135, crank arm 163, rod 165, bell cranks 167, 170 and 174, drive shaft 168, push rod 172, and cam 177.

The time relationship defined by the cams 128 and 177 is such that the rails 92 and 93 of each of the selector trays 44 are displaced into their open position at substantially the same time that the elevator members 107 and 108 are descending to move the various pusher components 100 of each selector tray into engagement with an underlying carton 24 in order to positively displace the same downwardly between the associated guide structures 98 and 99. Thereafter, the elevator members 107 and 108 are raised to their original position and the rails 92 and 93 are returned to their closed position to condition the mechanism for another cycle of operation.

Accumulator structure

The cartons 24 that are displaced downwardly from the selector trays 44 are received by an accumulator table mechanism disposed below the selector trays. The accumulator structure includes the aforementioned combining or assembly table 43 which in part is formed by a table or platform defined by two transversely spaced sections respectively identified as 179 and 180 (FIGURE 6). The assembly table 43 is also formed in part by a pair of conveyor sections 181 and 182 oriented in parallel relation and interposed between the platform sections 179 and 180. As best shown in FIGURES 1 and 2, the conveyor sections 181 and 182 are in effect continuations of or define the discharge conveyor 28.

The conveyor sections 181 and 182 are formed by endless belts entrained at one end about an idler roller 183 located adjacent the infeed conveyor 39. The other end of the endless belts is entrained about a drive roller (not shown) associated with the case packer 29. In order to support the weight of cartons 24 disposed along the conveyor sections 181 and 182 the endless belts thereof ride along a planer support element 184 which extends substantially from end to end of the conveyor sections.

Referring to FIGURE 2, it is seen that the assembly table 43 underlies all of the selector trays 44 but since the conveyor sections 181 and 182 constitute only an intermediate portion of the table 43 and are of restricted transverse extent, it is necessary that the cartons 24 which are displaced downwardly from the selector trays 44a, 44b, 44d and 44e and then cover a substantial transverse extent of the table be assembled or combined into two parallel rows respectively disposed along the conveyor sections 181 and 182. Accordingly, a mechanism is provided to effect such combining of the cartons, and referring to FIGURE 6, such combining mechanism is seen to include a pair of combining pushers 185 and 186 which, as illustrated in FIGURES 2, 6 and 12, are generally rectangular longitudinally extending bars. The combining pusher 185 is supported at the opposite ends thereof by roller structures 187 which rollingly engage rails 187′ bordering the platform section 179 along the transverse edges thereof (see FIGURE 3). Likewise, pusher 186 is supported by roller structures 188 which ride on rails 188′ bordering the platform section 180.

In order to stabilize the pushers during movement thereof, each is equipped at the rear end thereof adjacent the infeed conveyors with a transversely oriented extension 189 (see FIGURE 12) having rollers 189a and 189b which ride within a track 190. In order to have movement enforced thereon, the pusher 186 at the opposite ends thereof is pivotally connected by linkages 191 and 192 to a pair of sweep arms 193 anud 194. As shown in FIGURE 7, the sweep arm 193 is supported for pivotal movement intermediate the ends thereof by a shaft 195 to which it is clamped. In an analogous manner, the sweep arm 194 is clamped intermediate its ends to the same shaft 195.

The pusher 186 is similarly connected to sweep arms one of which is shown in FIGURES 6 and 7 and is denoted with the numeral 196. Such arm 196 is pivotally connected to the pusher 186 by a linkage 197 and, as shown in FIGURE 7, the arm 196 is supported adjacent the lower end thereof by a shaft 199 which extends longitudinally along the apparatus and at its opposite end is similarly connected to the other sweep arm (not shown) associated with pusher 186.

The shaft 199 is enlarged centrally, as shown at 200, and is equipped therealong with an arm 201 having at its outer end a cam follower 202 which ridingly engages the surface of a sweep cam 203. The cam follower 202 is resiliently biased into engagement with the sweep cam 203 by a helical spring 204 which at one end is secured to a connector link 205 and at its other end to the sweep arm 193. The connector link 205 is pivotally connected to the sweep arm 196, thereby urging the arm 201 and cam follower 202 thereof toward the sweep cam 203 and into engagement therewith. The sweep arm 193 below the pivot axis thereof is pivotally coupled to one end of a connector rod 206 which at its other end is pivotally connected to the sweep arm 196 above its pivot axis. Thus, the two sweep arms are caused to move in synchronism.

The sweep cam 203, being mounted on the shaft 129, is rotated therewith and rotational movement thereof causes the arm 201 and the shaft 199 (to which the arm is connected through the shaft enlargement 200) to be angularly reciprocated about the axis of the shaft 199 with the result that the sweep arms 193 and 196 are angularly reciprocated so as to cause the pushers 185 and 186 to be displaced between the open and closed positions thereof respectively shown by full lines and broken lines in FIGURE 2. Such reciprocable displacements of the pushers occur in time relation with the movement of the rails 92 and 93 and also with the movement of the pusher components 100 since all of the cams (128, 177 and 203) controlling the motions thereof are mounted upon the shaft 129 and are therefore synchronously driven by the motor 135.

Interposed between the assembly table 43 and the selector trays 44 disposed thereabove are a plurality of stop members positioned and arranged to define limits of movement in longitudinal directions for the cartons 24. More particularly, each of the trays 44 is provided with a forward guide or stop structure and with a rear guide, and FIGURE 9 illustrates the stop structure associated with the selector tray 44a. For the purpose of identification, the rear stop or guide is denoted 207 and the front stop or guide is formed in two sections denoted 208 and 209. The rear guide 207 is adjustably positionable along the associated tray 44, and to permit such adjustability any suitable fastener devices may be employed such as the flange and bolt arrangement 210, shown in FIGURE 9. In an analogous manner, the front stop sections 208 and 209 are fixedly secured to a support member 211 which at the opposite ends thereof is releasably secured to the guide structures 98 and 99 by means of fasteners in the form of bolt-type clamps 212 and 213.

The front stop sections 208 and 209 define a space or channel therebetween in which is positioned the aforementioned switch arm 89 which is adapted to actuate the associated limit switch 87. In this respect, cartons 24 are advanced along the rails 92 and 93 by the associated infeed conveyor 39 until the forwardmost carton engages the switch arm 89 and displaces the same forwardly into a position of substantial alignment with the front stop sections 208 and 209, as is most evident in FIGURE 10. Such forward displacement of the switch arm is effective to deenergize the presser conveyor 45, thereby terminating the advancement of cartons along the selector tray. The switch arm 89 is biased rearwardly so as to protrude between the forward stop sections 208 and 209 when not constrained in a forward position, and when the switch arm assumes such rearward position (which occurs when no carton 24 is in engagement therewith), the presser conveyor 45 is energized to cause additional cartons to be advanced along the selector tray.

The rear stop 207 and the front stop sections 208 and 209 are rigid components and confine cartons 24 therebetween, and the selector trays 44a, 44d and 44e are each provided with such front and rear stops to so confine cartons disposed therealong. The space between any pair of front and rear stops is determined by the requisite number of cartons to be provided by the respective selector trays, and the stops are so spaced and adjusted to accommodate such number. Thus, in the specific arrangement shown in FIGURE 2, the front and rear stops of the selector tray 44a are spaced from each other by a distance equivalent to ten cartons, the front and rear stops of selector tray 44d are spaced apart by a distance equivalent to six cartons, and the front and rear stops of selector tray 44e are spaced apart by a distance equivalent to four cartons.

The selector tray 44b is also provided with fixed front and rear stops similar in essential respects to the stops provided for the selector trays 44a, 44d and 44e. The rear stop or guide 207b, however, is of shorter transverse length so that it will not extend over the discharge conveyor 181 where it could interfere with the movement of cartons therealong. The front stop section 209b is shorter (see FIGURE 6) in vertical dimension and terminates above the upper surface of the cartons 24 supported on the underlying conveyor section 181. Similarly, the stop section 208b has been shortened in the area above the conveyor 181 so that this stop section extends downwardly to guide only one end portion of the cartons 24 in an area where it will not interfere with cartons being advanced by the conveyor 181.

The selector tray 44c is also provided with front and rear stops therealong, and the rear stop thereof may be a fixed component, as described hereinbefore, and is denoted 207c. However, the front stop of the tray 44c is movable in order to enable cartons to be advanced therepast. FIGURE 11 illustrates the front stop of the selector tray 44c, and referring to this figure it will be noted that such stop comprises upper and lower components. The upper component is esentially the same as the prior described stop structure comprising the sections 208 and 209, and the significant difference between such stop members is that the stop associated with the selector tray 44c is shorter in vertical dimension and terminates above the upper surface of cartons 24 supported upon the underlying conveyor section 182. For the purpose of identification, the two sections of the front stop associated with the selector tray 44c are denoted as 214c and 215c.

Positioned beneath stops 214c and 215c and in vertical alignment therewith is a movable front stop component 216c pivotally supported on a shaft 217c and biased into the rearward position shown by full lines in FIGURE 11 by a torsion spring 218c. The stop component 216c may be displaced into the position shown by broken lines in FIGURE 11 by cartons 24 being advanced forwardly by the conveyor section 182. The force provided by the torsion spring 218 is sufficiently large to maintain the stop component 216c in the position of alignment thereof with the front stop sections 214c and 215c when cartons 24 are displaced downwardly from the tray section 44c and onto the underlying conveyor section 182.

The arrangement of cartons 24 depicted in FIGURE 2 requires that one additional carton be displaced onto the conveyor 181 from beneath one or the other of the selector trays 44c, 44d or 44e in order that a comparable number of cartons (e.g. a total of 18) be advanced by each of the conveyor sections 181 and 182 to the case packer 29. In the mechanism illustrated, such additional carton is displaced from a position underlying the selector tray 44c, and to effect such displacement of the carton the pusher 186 is equipped with an extension 220 projecting inwardly beneath the selector tray 44e toward the selector tray 44d. Upon inward movement of the pusher 186, the extension 220 thereof engages a carton in alignment therewith and displaces such carton onto the conveyor section 181 which then advances such carton forwardly past the rear stop 207b. All of the stationary rear stops are similar and are supported along the edge of the apparatus and extend inwardly to the appropriate points in a manner completely analogous to that of the stop 207a as shown in FIGURE 9.

Operation

In describing a complete cycle of operation of the color selector mechanism 38, attention will first be directed to an operating sequence of one of the color lines and in particular the line defined by the infeed conveyor 39a and color selector tray 44a. Accordingly, the infeed conveyor 39a is seen to be supplied with cartons 24 from the tote box unloader 40a, as described hereinbefore, and such conveyor operates to advance cartons received thereby toward and under the presser conveyor 45a. In this respect the motor 51 rotably drives the roller 55 which in turn advances the endless belt 56a of the infeed conveyor. In the event that the advancement of cartons disposed beneath the presser conveyor 45a is prevented, as when the selector tray 44a is completely filled with cartons, the presser conveyor 45a is released by actuation of the limit switch 87a and the endless belt 56a simply slips under the cartons if the motor 51 remains energized.

In order to control operation of the motor 51 driving the infeed conveyor 39a, the electric control circuit is provided with a time delay mechanism (not shown) operative in conjunction with the limit switch 87a to de-energize the motor 51, thereby terminating operation of the infeed conveyor when such conveyor has a sufficient supply of cartons therealong to fill the tray 44a during the following cycle of operation. Thus, the location of such limit switch is remote from the presser conveyor 45a in the direction of the tote box unloader 40a. A control system of the type being considered requires the inclusion in the apparatus of means for initiating each successive cycle of operation of the infeed conveyor. Although numerous arrangements may be employed to effect the result, in the present apparatus, as shown in FIGURE 3, such means comprises a cam 223 mounted upon the shaft 129 and a switch 224 associated with such cam so as to be actuated thereby during each cycle of operation of the apparatus. In the specific apparatus being considered, therefore, the infeed conveyors are operative intermittently, and the periods of operation and inoperation are indeterminate because they are controlled at least in part by the disposition of cartons along the infeed conveyors and along the trays 44 associated therewith.

Considering an operational sequence and assuming that the selector tray 44a is devoid of cartons, the switch 87a will then have the arm 89a thereof projecting rearwardly of the associated front stop sections 208a and 209a. When both the infeed conveyor belt 56a and the presser conveyor belt 46a have been placed in motion as a consequence of the motor 51a having been energized at the proper time by coaction of the switch 224 and cam 223, and when the presser conveyor 46a has been placed in drive condition as a result of the inflatable bellows 84a having been energized by the same switch 224, cartons 24 disposed intermediate the belts 56a and 46a will be positively advanced onto the rails 92a and 93a and forwardly therealong until the selector tray 44a is filled. Complete filling of the tray 44a resutls in the switch arm 89a being displaced forwardly into the position illustrated in FIGURE 10, whereupon the presser conveyor 45a is de-energized by de-pressurization of the bellows 84a thereof, and the time delay mechanism is conditioned to de-energize the conveyor motor 51a when the manually set period of time has elapsed.

When all of the selector trays 44 are filled with cartons in the manner described, and provided that the case packer 29 is demanding cartons (both of which conditions need to be satisfied in the present apparatus), the motor 135 is energized whereupon the cam 177 is rotated by the shaft 129 into a position at which the bell crank 174 is angularly displaced in a counterclockwise direction, as viewed in FIGURE 7, thereby causing the elongated push rod 172 to be pulled downwardly along the longitudinal axis thereof. Such movement of the push rod 172 results in each pair of rails 92 and 93 being displaced into their open position to condition the same for the passage of cartons 24 downwardly therebetween. Energization of the motor 135 also rotates the cam 128 into a position at which the crank arm 124 is angularly displaced in a clockwise direction, as viewed in FIGURE 7, whereupon the elevator members 107 and 108 are permitted to descend with the result that the pusher components 100 along each of the selector trays 44 engage underlying cartons and positively displace the same between the open rails and onto the assembly table 43. The relative angular orientation of the cams 177 and 128 upon the shaft 129 is such that downward movement of the pusher components 100 follows initiation of the opening movement of the rails 92 and 93 by a few degrees (e.g. 15°), and in addition thereto a slight pretravel of the pusher components 100 is included before they engage the respectively underlying cartons 24.

Subsequently, the cam 203 is rotated by the shaft 129 into a position in which the arm 201 is angularly displaced in a counterclockwise direction, as viewed in FIGURE 7, whereupon the sweep arms 193 and 196 are swung inwardly to displace the combining pushers 185 and 186 inwardly toward the conveyor sections 181 and 182. Such inward movement of the combining pushers 185 and 186 results in the cartons 24 underlying the respectively associated selector trays 44 being displaced onto the conveyor sections 181 and 182 to form two substantially parallel rows thereof. The cam 203 may be angularly disposed relative to the cam 128 such that inward movement of the combining pushers 185 and 186 trails initiation of the opening movement of the rails 92 and 93 by about 50°, and a slight pretravel of the combining pushers can be provided before engagement thereof with the cartons 24. After the cartons 24 are so combined or positioned along the conveyor sections 181 and 182, the cams 128, 177 and 203 are returned to their original or starting position by continued rotation of the shaft 129, whereupon each pair of rails 92 and 93 are returned to the closed position thereof shown in FIGURE 6, the pusher components 100 are returned to their elevated position, and the combining pushers 185 and 186 are returned to their outer retracted position. The motor 135 is then de-energized and remains so until the aforementioned two conditions again exist, and such de-energization may be effected by a cam 225 mounted upon the shaft 129 and a switch 226 adapted to be actuated by the cam and connected in the energizing circuit of the motor 135. The motor (not shown) driving the conveyor sections 181 and 182 is energized by a limit switch 227, actuated by a cam 228 mounted upon the shaft 129, at substantially the same time that the combining pushers 185 and 186 have completed their inward travel, thus displacing all of the cartons 24 onto such conveyor sections, the conveyor sections 181 and 182 are then de-actuated upon command from the case packer 29 or, alternatively, after the cartons thereon have been advanced clear of the combining table 43.

The apparatus can be conditioned to operate with only one color simply by unloading the tote boxes 32 containing cartons 24 having tissue of such one color along the respective tote box unloaders 40a through 40e from which they are carried by the respectively associated infeed conveyors 39a through 39e to the color selector mechanism 38. In a cycle of operation, the color selector mechanism displaces cartons 24 disposed along the various trays 44a through 44e downwardly and onto the combining table 43 from which such cartons are displaced onto the conveyor sections 181 and 182. Accordingly, the apparatus functions in the same manner as where mixed case lots are being processed, except that all of the cartons disposed along the conveyor sections 181 and 182 contain tissue of the same color.

The apparatus is readily adjusted to change the ratio of cartons containing variously colored tissue in accordance with customer demand. In this respect, the retainers 157 and 158 when not in use are located in the retracted position thereof illustrated by broken lines in FIGURE 9, and to condition the retainers for use they are rotated inwardly into the position shown by full lines in FIGURE 9 and are locked in such position by clamping the same to the respectively associated shafts 161 and 162. Accordingly, a carton 24 disposed above the retainers in such inner position will be constrained thereby against downward movement when the rails 92 and 93 are opened. Thus, the cartons along a tray 44 which are to be displaced downwardly and onto the table sections 179 and 180 when the rails 92 and 93 are opened will be determined by the position of the various pairs of retainers 157 and 158 disposed along such tray.

Correspondingly, the pushers 100 are adjustably carried by the associated hangers 106 and can be selectively positioned therealong so as to overlie the cartons 24 which are to be displaced downwardly and onto the table sections 179 and 180. Further, pushers 100 can be added or removed, as necessary, from the associated hangers 106 by releasing the respectively associated cap screws 105.

It will be appreciated that the selector mechanism, as well as the method of selection, illustrated and described herein, is not only effective to process cartons of facial tissue but is also effective and adaptable to process a diversity of articles, in that the selection ratio is determined not by the precise nature or character of the article being processed but rather by the position of the retainers 157 and 158 and the pushers 100.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In mechanism for selecting and segregating from a plurality of articles a lesser predetermined number thereof, infeed structure for advancing such plurality of articles into a selection station, first support elements at such station movable between article-retaining and article-release positions for releasably supporting such lesser number of articles to be selected from such plurality thereof, second support elements at such station to maintain thereat when such lesser number of articles are released by said first support elements those articles constituting the difference between the plurality of articles and such lesser number thereof, and actuator structure connected with said first support elements for selectively moving the same between such positions thereof to release articles supported thereby.

2. The mechanism of claim 1 and further comprising a plurality of pusher elements located at such selection station and being respectively engageable with such lesser number of articles thereat to displace the same away from said first support elements when released thereby, and apparatus for selectively moving said pusher elements between a retracted position remote from such lesser number of articles and an extended position in engagement therewith.

3. The mechanism of claim 1 in which said first support elements comprise a pair of longitudinally extending rails selectively movable between an inner position in which said lesser number of articles is supported thereon and an outer position in which said lesser number of articles is displaceable downwardly therebetween.

4. The mechanism of claim 1 and further comprising a plurality of pusher elements located at such selection station and being respectively engageable with such lesser number of articles thereat to displace the same away from said first support elements, also comprising apparatus for selectively moving said pusher elements between a retracted position remote from said lesser number of articles and an extended position in engagement therewith, and in which said first support elements comprise a pair of longitudinally extending rails selectively movable between an inner position in which said lesser number of articles is supported thereon and an outer position in which said lesser number of articles is displaceable downwardly therebetween.

5. The mechanism of claim 1 in which said second support elements comprise a plurality of pairs of support elements respectively aligned with those articles constituting the difference between the plurality of articles and such lesser number thereof, and further comprising support structure for said pairs of support elements, said pairs of support elements being adjustably carried by said support structure therefor to enable adjustment of said mechanism to accommodate various article selections.

6. The mechanism of claim 5 in which said first support elements comprise a pair of longitudinal extending rails selectively movable between an inner position in which said lesser number of articles is supported thereon and an outer position in which said lesser number of articles is displaceable downwardly therebetween.

7. The mechanism of claim 1 in which said infeed structure comprises conveyor apparatus for advancing such plurality of articles into the selection station.

8. The mechanism of claim 7 in which said conveyor apparatus includes an infeed conveyor having an endless belt adapted to support articles thereon and advance the same toward the selection station and further includes a presser conveyor disposed above said infeed conveyor and being selectively operable to engage articles supported on said infeed conveyor to cooperate therewith in positively displacing articles into the selection station.

9. The mechanism of claim 8 in which said presser conveyor comprises an endless belt, a presser device having a component thereof selectively movable into an extended position in which it is in engagement with the belt to displace the same toward said infeed conveyor and into a retracted position in which the belt is moved away from said infeed conveyor, and control structure responsive to the requirement for articles at the selection station for actuating said presser device to displace the belt of said presser conveyor toward said infeed conveyor to cooperate therewith in the positive displacement of articles into the selection station.

10. The mechanism of claim 1 in which said selection station is elongated in the longitudinal direction in which articles are advanced thereinto so as to receive a row of articles comprising a succession of adjacent articles.

11. The mechanism of claim 1 in which said selection station comprises a plurality of transversely spaced and substantially parallel article-receiving trays each elongated in the longitudinal direction in which articles are advanced thereinto and each adapted to receive a row of articles comprising a succession of adjacent articles advanced thereinto from said infeed structure.

12. The mechanism of claim 11 and further comprising an assembly table which receives thereon the aforementioned lesser number of articles released by said first support elements in substantially the same orientation in which they are positioned along said trays whereby the articles remain in substantially parallel rows, and in which said mechanism also comprises combining structure for combining the rows of articles positioned on said assembly table into a reduced number of rows.

13. The mechanism of claim 12 in which said infeed structure comprises a plurality of transversely spaced and substantially parallel conveyor apparatuses respectively aligned with said article-receiving trays for advancing such plurality of articles thereinto.

14. The mechanism of claim 13 in which each of said conveyor apparatuses includes an infeed conveyor having an endless belt adapted to support articles thereon and advance the same toward the associated article-receiving tray and further includes a presser conveyor disposed above said infeed conveyor and being selectively operable to engage articles supported on the associated infeed conveyor to cooperate therewith in positively displacing articles into the associated article-receiving tray.

15. The mechanism of claim 14 in which said combining structure includes a pair of transversely spaced combining elements respectively disposed along the transverse edge portions of said assembly table and being reciprocable transversely toward each other to combine the articles on said assembly table into such reduced numbers of rows, and actuator mechanism for selectively reciprocating said combining elements.

16. The mechanism of claim 15 in which said selection station comprises a plurality of transversely spaced and substantially parallel article-receiving trays each elongated in the longitudinal direction in which articles are advanced thereinto and each adapted to receive a row of articles comprising a succession of adjacent articles advanced thereinto from said infeed structure, and in which said mechanism further comprises a plurality of pusher elements located at such selection station and being respectively engageable with such lesser number of articles thereat to displace the same away from said trays when released by said first support elements, and apparatus for selectively moving said pusher elements between a retracted position remote from such lesser number of articles and an extended position in engagement therewith.

17. The mechanism of claim 16 and further comprising an assembly table which receives thereon the aforementioned lesser number of articles released by said first support elements in substantially the same orientation in which they are positioned along said trays whereby the articles remain in substantially parallel rows, and in which said mechanism also comprises combining structure for combining the rows of articles positioned on said assembly table into a reduced number of rows.

18. The mechanism of claim 17 in which said infeed structure comprises a plurality of transversely spaced and substantially parallel conveyor apparatuses respectively aligned with said article-receiving trays for advancing such plurality of articles thereinto.

19. The mechanism of claim 18 in which said combining structure includes a pair of transversely spaced combining elements respectively disposed along the transverse edge portions of said assembly table and being reciprocable transversely toward each other to combine the articles on said assemble table into such reduced number of rows, and actuator mechanism for selectively reciprocating said combining elements.

20. The mechanism of claim 17 in which said assembly table is equipped intermediate the transverse edge portions thereof with a discharge conveyor adapted to receive thereon such reduced number of rows.

21. The mechanism of claim 1 and further comprising an assembly table which receives thereon the aforementioned lesser number of articles released by said first support elements, said assembly table being equipped intermediate the transverse edge portions thereof with a discharge conveyor adapted to remove such lesser number of articles from said assembly table, said mechanism also comprising combining structure for collecting the articles received by said assembly table onto said discharge conveyor.

22. In mechanism for selecting cartons of variously colored tissue preparatory to packaging the cartons in a container therefor and which selected cartons are segregated from a plurality of cartons and constitute a lesser number thereof, a selection station comprising a plurality of transversely spaced and substantially parallel carton-receiving trays each of which is longitudinally extending and is adapted to have advanced therealong a row of cartons containing tissue of one color, infeed structure for advancing cartons into such selection station and including a plurality of conveyor apparatuses respectively aligned with said trays for advancing cartons thereinto, each of said trays being equipped with first support elements movable between carton-retaining and carton-release portions for releasably supporting such lesser number of cartons to be selected from such greater plurality thereof, actuator structure connected with said first support elements for selectively moving the same between such positions thereof to release cartons support thereby, each of said trays further being equipped with second support elements to maintain therealong when such lesser number of cartons are released by said first support elements those cartons constituting the difference between the greater plurality of cartons and such lesser number thereof, an assembly table for receiving thereon such lesser number of cartons released by said first support elements and including a discharge conveyor disposed intermediate the transverse edge portions of said table, and combining structure for displacing the cartons oriented in substantially parallel rows when received on said assembly table into a lesser number of rows along said discharge conveyor which then adavnces the cartons thereon toward a packaging station.

23. The mechanism of claim 22 and further comprising a plurality of pusher elements located above said trays in respective alignment with such lesser number of cartons therealong to be selected from the greater number thereof, and apparatus for selectively moving said pusher elements into engagement with the cartons constituting such lesser number thereof to displace the same from said trays and onto said assembly table when said first support elements are in the release position thereof.

24. In mechanism for selecting cartons of variously colored tissue preparatory to packaging the cartons in a container therefor and which selected cartons are segregated from a plurality of cartons and constitute a lesser predetermined number thereof, infeed structure for advancing such plurality of cartons into a selection station, first support elements at such station movable between carton-retaining and carton-release positions for releasably supporting thereon such plurality of cartons from which such lesser predetermined number thereof is selected, second support elements at such station to maintain thereat when said first support elements are moved into the carton-release position thereof those cartons constituting the difference between the plurality of cartons and such lesser number thereof, and actuator structure connected with said first support elements for selectively moving the same between such positions thereof to release cartons supported thereby.

25. In mechanism for selecting cartons of variously colored tissue preparatory to packaging the cartons in a container therefor and which selected cartons are segregated from a plurality of cartons and constitute a lesser number thereof, a selection station comprising a plurality of transversely spaced and substantially parallel carton-receiving trays each of which is longitudinally extending and is adapted to have advanced therealong a row of cartons containing tissue of one color, infeed structure for advancing cartons into such selection station such that the cartons advanced along each of said trays contains tissue of only one such color, each of said trays being equipped with first support elements movable between carton-retaining and carton-release positions for releasably supporting thereon the cartons comprised in the associated row thereof, actuator structure connected with each of said first support elements for selectively moving the same between such positions thereof to release cartons supported thereby, and each of said trays also being equipped with second support elements to maintain therealong when said first support elements are moved into the carton-release position thereof those cartons constituting the difference between the plurality of cartons comprising the associated row thereof and such lesser number of cartons selected therefrom.

26. The mechanism of claim 25 in which the first support elements associated with each of said trays comprise a pair of longitudinally extending rails selectively movable between an inner position in which cartons are supported thereon and an outer position in which such cartons are displaceable downwardly therebetween.

27. The mechanism of claim 25 and further comprising support structure for said second support elements associated with each of said trays and adjustably carrying the associated second support elements to enable adjustment of said mechanism to accommodate various carton selections.

28. In a method of selecting cartons of variously colored tissue preparatory to packaging the cartons in a container for shipment from a manufacturing plant to a retail outlet or the like, the steps of advancing one after another into a selection station a substantially endless succession of cartons divided into color groups in accordance with the respective tissue colors, displacing concurrently from such selection station a predetermined number of cartons, sufficient to fill a container therefor, of each such color group and assembling such displaced cartons preparatory to packaging the same in such container.

29. In a method of selecting cartons of variously colored tissue preparatory to packaging the cartons in a container therefor, the steps of advancing into a selection station a succession of cartons divided into color groups in accordance with the respective tissue colors, displacing from such selection station a predetermined number of cartons of each such color group and assembling such displaced cartons preparatory to packaging the same in a container therefor, the cartons containing tissue of any one color being advanced one after the other in a generally straight-line path into said selection station.

30. In a method of selecting cartons of variously colored tissue preparatory to packaging the cartons in a container therefor, the steps of advancing into a selection station a succession of cartons divided into color groups in accordance with the respective tissue colors, displacing from such selection station a predetermined number of cartons of each such color group and assembling such displaced cartons preparatory to packaging the same in a container therefor, the cartons of variously colored tissue being oriented so that the cartons containing tissue of any one color are advanced one after the other in a generally straight-line path into said selection station with all of the paths being disposed in transversely-spaced substantially-parallel relation.

31. The method of claim 30 in which the aforementioned step of assembling the displaced cartons comprises displacing the same transversely to combine them into a reduced number of substantially parallel rows.

32. In a method of selecting cartons of variously colored tissue preparatory to packaging the cartons in a container therefor, the steps of advancing into a selection station a succession of cartons divided into color groups in accordance with the respective tissue colors, displacing from such selection station a predetermined number of cartons of each such color group and assembling such displaced cartons preparatory to packaging the same in a container therefor, the step of assembling cartons being performed beneath the selection station and the step of displacing cartons therefrom comprising accelerating such cartons downwardly from said selection station and onto a combining table.

References Cited
UNITED STATES PATENTS 3,262,584   7/1966   Hayford _____ 198—33

RICHARD E. AEGERTER, *Primary Examiner.*